United States Patent
Watanabe et al.

(10) Patent No.: US 6,187,477 B1
(45) Date of Patent: Feb. 13, 2001

(54) LITHIUM SECONDARY BATTERY AND CATHODE COMPOSITION THEREFOR

(75) Inventors: Isao Watanabe; Hiroshi Horiuchi; Kensuke Yoshida; Tsutomu Miyashita; Tamotsu Yamamoto; Masami Tsutsumi, all of Kawasaki (JP)

(73) Assignee: Fujitsu Limited, Kawasaki (JP)

( * ) Notice: Under 35 U.S.C. 154(b), the term of this patent shall be extended for 0 days.

(21) Appl. No.: 09/163,012

(22) Filed: Sep. 30, 1998

(30) Foreign Application Priority Data

Mar. 5, 1998 (JP) .................................................. 10-053138

(51) Int. Cl.$^7$ ...................................................... H01M 4/58
(52) U.S. Cl. .................. 429/231.95; 429/231.9; 429/218.1; 429/199; 429/62
(58) Field of Search ........................... 429/231.95, 231.9, 429/218.1, 199, 62

(56) References Cited

U.S. PATENT DOCUMENTS

| | | | |
|---|---|---|---|
| 4,251,607 | * | 2/1981 | Yamaki et al. ........................ 429/194 |
| 4,343,871 | * | 8/1982 | Tobishima et al. .................. 429/197 |
| 5,506,068 | | 4/1996 | Dan et al. ............................... 429/50 |
| 5,714,277 | * | 2/1998 | Kawakami .............................. 429/62 |

FOREIGN PATENT DOCUMENTS

| | | |
|---|---|---|
| 54-52157 | 4/1979 | (JP) . |
| 59-207230 | 11/1984 | (JP) . |
| 4-95363 | 3/1992 | (JP) . |
| 5-74443 | 3/1993 | (JP) . |
| 7-78635 | 3/1995 | (JP) . |
| 8-55638 | 2/1996 | (JP) . |

* cited by examiner

Primary Examiner—Stephen Kalafut
Assistant Examiner—Raymond Alejandro
(74) Attorney, Agent, or Firm—Armstrong, Westerman, Hattori, McLeland & Naughton

(57) ABSTRACT

A lithium secondary battery includes a cathode which can be dischargeably charged with lithium ions, an anode made of lithium metal, a lithium alloy or any other anode material which can be releasably doped with lithium ions, and an electrolyte which allows migration of lithium ions between both electrodes. The cathode contains a halogen compound which releases halogen atoms, halogen ions or a reactive halogen-containing substance for reacting with the anode, thereby deactivating the anode to prevent excessive heat generation before oxygen released from the cathode due to a temperature rise reacts with the anode.

4 Claims, 3 Drawing Sheets

LITHIUM SECONDARY BATTERY AND CATHODE COMPOSITION THEREFOR

BACKGROUND OF THE INVENTION

1. Field of the Invention

The present invention relates to a lithium secondary battery which may be used as a power source for retaining data in a memory of an electronic apparatus (e.g., a personal computer) or for driving a portable electronic apparatus (e.g., a portable telephone receiver). The present invention also relates to a cathode composition used for such a battery.

2. Description of the Related Art

As is well known, a lithium secondary battery comprises a cathode dischargeably charged with lithium ions, an anode and an electrolyte which allows migration of lithium ions between both electrodes. The anode may consist of lithium metal, a lithium alloy or any other material which can be releasably doped with lithium ions. Typically, the electrolyte may be a nonaqueous electrolytic solution which is prepared by dissolving a lithium salt in an organic solvent.

Due to the high energy density and the use of an organic solvent, a lithium secondary battery is known to have a problem of generating a large amount of heat under severe conditions. For example, the lithium battery generates heat at the time of compression (e.g., battery crushing under a heavy object), nail piercing (e.g., when erroneously driving a nail into the battery at the time of packaging), internal shorting, exposure to high temperature, or external shorting.

One way to solve such a problem is to provide a porous separator between the cathode and the anode, as disclosed in JP-A-54(1979)-52157 or JP-A-59(1984)-207230 for example. According to this solution, the pores of the separator are closed at the melting point of the separator material due to the fusion thereof, thereby interrupting the ion migration between the cathode and the anode. As a result, the current flow terminates to stop the temperature rise.

As an improvement to a lithium secondary battery incorporating a porous separator, JP-A-5(1993)-74443 discloses an arrangement wherein the separator has an excess portion projecting beyond the edge faces of the cathode and the anode, and wherein the excess portion of the separator is pressed down against the edge faces of both electrodes by an insulating plate which is thermally fusible to the separator. Such an arrangement prevents excess heat generation or thermal runaway which may occur through shorting between the cathode and the anode due to a shrinkage of the separator near the edge faces of both electrodes after the pores of the separator are thermally closed.

However, the prior art lithium secondary battery incorporating the porous separator operates properly for the prevention of excessive heat generation only when the separator is kept in its appropriate state. Therefore, the battery is incapable of preventing excessive heat generation if the cathode comes into direct contact with the anode upon rupture of the separator under crushing of the battery or if both electrodes are shorted via a nail which has penetrated through the separator. It should be noted that excessive heat generation in a lithium secondary battery occurs because the Joule heat generated at the time of shorting causes oxygen to separate from the cathode active substance for reacting with active lithium.

On the other hand, JP-A-7(1995)-78635 proposes the use, in a lithium secondary battery, of an electrolytic solution which contains $LiAsF_6$/1,3-dioxolane+tertiary amine. Normally, the tertiary amine prevents polymerization of 1,3-dioxolane. Conversely, when the temperature of the battery rises due to high-temperature exposure or shorting for example, 1,3-dioxolane starts polymerizing to increase the internal resistance of the battery, whereby the current flow decreases and the temperature of the battery drops.

However, the above-described electrolytic solution contains As in $LiAsF_6$. Therefore, sufficient care needs to be taken in handling the battery for preventing environmental pollution. Further, the electrolytic solution is known to decompose when the battery voltage increases to no less than 4V, so that the candidate materials for the cathode active substance are limited to those which make the charge terminating voltage of the battery below 4V. This is critically disadvantageous in increasing the energy density of the battery.

SUMMARY OF THE INVENTION

It is, therefore, an object of the present invention is to provide a lithium secondary battery which is capable of reliably preventing excessive heat generation even under severe conditions such as battery crushing, nail piercing, internal shorting, high-temperature exposure or external shorting without entailing the problems of the prior art lithium batteries described above.

Another object of the present invention is to provide a cathode composition which can be advantageously used for such a battery.

According to a first aspect of the present invention, there is provided a lithium secondary battery comprising: a cathode which can be dischargeably charged with lithium ions; an anode selected from a group consisting of lithium metal, a lithium alloy and any other anode material which can be releasably doped with lithium ions; and an electrolyte which allows migration of lithium ions between both electrodes; wherein the cathode contains a halogen compound which releases halogen atoms, halogen ions or a reactive halogen-containing substance for reacting with the anode and for thereby deactivating the anode to prevent excessive heat generation before oxygen released from the cathode due to a temperature rise reacts with the anode.

With the structure, when the temperature of the battery rises due to battery crushing, nail piercing, internal shorting, high-temperature exposure or external shorting, the halogen compound contained in the cathode decomposes to generate a halogen-family gas (halogen atoms, halogen ions or halogen-containing substance in gaseous phase) before oxygen released from the cathode reacts with the anode. The halogen-family gas thus generated reacts with active lithium of the anode to form a layer of lithium halide which is thermodynamically stable (i.e., inert or inactive). As a result, the lithium halide layer serves as an oxidation preventing layer even if oxygen is later released from the cathode, thereby preventing excessive heat generation which would be otherwise caused by oxidation of lithium.

Further, in case where a temperature rise is caused by internal shorting of the battery, the lithium halide layer formed on the anode interrupts current flow at the shorted portion because it has electrical insulation. Thus, the lithium halide layer has a dual function of serving as an oxidation preventing layer and as an insulating layer for effectively preventing excessive heat generation.

In general, the halogen compound contained in the cathode, if it thermally decomposes at a temperature of 100~380° C., can release a halogen-family gas (i.e., halogen atoms, halogen ions or a reactive halogen-containing substance in gaseous phase) before oxygen released from the cathode reacts with the anode. Examples of the halogen compound include iodine compounds, bromine compounds, chlorine compounds, fluorine compounds and any other compounds which contain two different kinds of halogens.

Examples of iodine compounds include 4,4'-diiodobiphenyl and p-iodotoluene.

Examples of bromine compounds include tetrabromobisphenol S represented by the following formula (1), hexabromobenzene, brominated amides, carbonate oligomers of tetrabromobisphenol A represented by the following formula (2), polymers of an derivative of tetrabromobisphenol A represented by the following formula (3), pentabromotoluene, p-bromobenzoic acid, 1,3,5-tribromobenzene, tetrabromodiphenyl ether, and 2,4,6-tribromophenol.

ins or chlorine-containing fluororesins may be contained in the cathode composition as a binder. Therefore, no separate binder needs to be added.

Those of the above-mentioned halogen compounds which cannot be used as a binder may be contained in addition to the active substance, the electrically conductive agent and the binder. In this case, a fluororesin or a chlorine-containing fluororesin may be also used as the binder.

In either case, the content of the halogen compound in the cathode may be preferably 0.5~20 wt %. A proportion below 0.5 wt % results in insufficiency of preventing excessive heat generation of the battery. On the other hand, a proportion beyond 20 wt % results in a decrease of the battery capacity due to a decrease of the content of the cathode active substance while reaching the ceiling (upper limit) in preventing excessive heat generation of the battery.

(1)

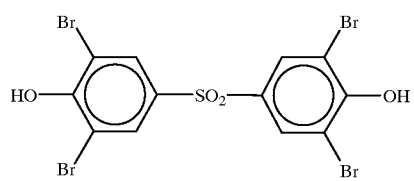

(2)

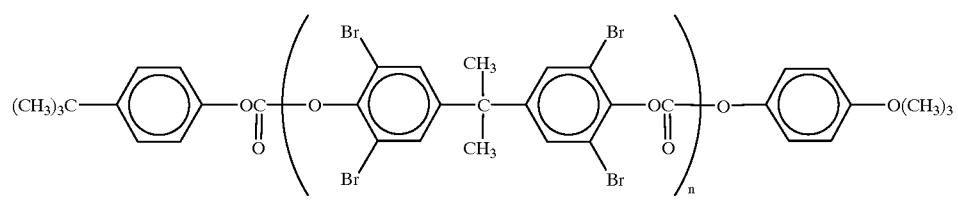

(3)

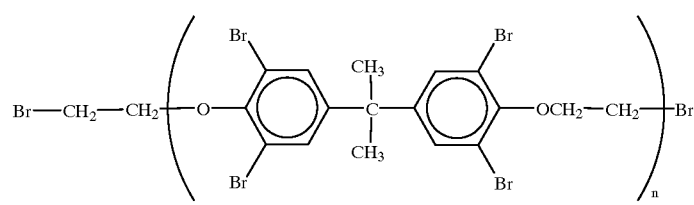

Examples of chlorine compounds include chlorinated paraffins, chlorinated polyethylene, tetrachlorophthalic anhydride, perchlorocyclopentadecane, chlorend acid, and poly(vinylidene chloride).

Examples of fluorine compounds include fluororesins such as poly(vinylidene fluoride) (PVDF), polytetrafluoroethylene (PTFE), tetrafluoroethylene-perfluoroalkylvinylether copolymer (PFA), tetrafluoroethylene-hexafluoropropylene copolymer (FEP), tetrafluoroethylene-hexafluoropropylene-perfluoroalkylvinylether copolymer (EPE), poly(vinyl fluoride) (PVF).

Examples of compounds containing two different kinds of halogens include chlorine-containing fluororesins such as poly(chlorotrifluoroethylene) (PCTFE), chlorotrifluoroethyleneethylene copolymer (ECTFE), and vinylidene fluoride-trifluorochloroethylene copolymer (VDF-CTFE).

Generally, the cathode composition contains a cathode active substance which can be dischargeably charged with lithium ions, an electrically conductive agent for increasing the electrical conductivity of the cathode, and a binder for binding the cathode active substance and the electrically conductive agent together. Of the various examples of halogen compounds mentioned above, each of the fluorores- According to a second aspect of the present invention, there is provided a lithium secondary battery comprising: a cathode which can be dischargeably charged with lithium ions; an anode selected from a group consisting lithium metal, a lithium alloy and any other anode material which can be releasably doped with lithium ions; and an electrolyte which allows migration of lithium ions between both electrodes; wherein the cathode contains a halogen compound which releases halogen atoms, halogen ions or a reactive halogen-containing substance at a temperature of 100~380° C. by thermal decomposition for reacting with the anode and for thereby deactivating the anode to prevent excessive heat generation.

The upper limit (380° C.) of the above temperature range generally corresponds to a temperature at which oxygen released from the cathode active substance is likely to start reacting with the anode. On the other hand, the lower limit (100° C.) of the above temperature range is determined in consideration of the fact that the cathode composition needs to be dried by heating during its preparation, so that it is necessary to prevent unexpected thermal decomposition of the halogen compound in the drying step.

The present invention further aims to provide a cathode composition for a lithium battery.

Specifically, according to a third aspect of the present invention, there is provided a cathode composition containing: a cathode active substance which can be dischargeably charged with lithium ions; an electrically conductive agent; a binder; and a halogen compound which releases halogen atoms, halogen ions or a reactive halogen-containing substance at a temperature of 100~380° C. by thermal decomposition.

Examples of cathode active substance include $LiCoO_2$, $LiNi_{(1-x)}M_xO_2$ (where $0 \leq x \leq 0.5$, M representing at least one metal element selected from the group consisting of Ti, V, Cr, Mn, Fe, Co, Cu, Zn, Al and B), $LiMnO_2$, $LiMn_3O_4$, $LiMn_3O_6$ and $LiV_2O_5$. However, the present invention is not limited to these examples.

Examples of electrically conductive agent include acetylene black and graphite. However, these examples are not limitative, and other conductive agents used for the cathode composition of a known lithium secondary battery are also usable for the battery of the present invention.

On the other hand, the anode may be made of lithium metal (in the form of a lithium foil or plate) or a lithium alloy plate (e.g., lithium-aluminum alloy, lithium-tin alloy, lithium-lead alloy, lithium-bismuth alloy, lithium-antimony alloy, lithium-magnesium alloy, and lithium-indium alloy). Alternatively, the anode may be made of a lithium-carbon composite or a lithium-graphite composite.

The electrolyte for allowing migration of lithium ions between the cathode and the anode may comprise a non-aqueous electrolytic solution which is prepared by dissolving a lithium-ion-conductive solute in an organic solvent. Examples of lithium-ion-conductive solute include $LiPF_6$ (lithium hexafluorophosphate) and $LiBF_4$ (lithium tetraborate), $LiClO_4$ (lithium perchlorate). Examples of organic solvent include propylene carbonate (PC), tetrahydrofuran (THF), ethylene carbonate (EC), 1,2-dimethoxyethane (DME), diethyl carbonate (DEC), 2-methyl-tetrahydrofuran (2-MeTHF) and dimethyl carbonate (DMC). Alternatively, the electrolyte may comprise a solid electrolyte such as polyethylene oxide (PEO).

According to a fourth aspect of the present invention, there is provided a cathode composition containing: a cathode active substance which can be dischargeably charged with lithium ions; an electrically conductive agent; and a binder; wherein the binder comprises a halogen compound which releases halogen atoms, halogen ions or a reactive halogen-containing substance at a temperature of 100~380° C. by thermal decomposition.

It is critically important for the present invention that the halogen compound contained in the cathode active substance releases halogen atoms, halogen ions or a reactive halogen-containing substance for reacting with the anode before oxygen released from the cathode due to a temperature rise reacts with the anode (or in a temperature range of 100~380° C.). Due to such a property, an oxidation preventing layer made of lithium halide is formed before oxygen released from the cathode active substance reacts with lithium of the anode.

It is already known to use a fluororesin or a chlorine-containing fluororesin as a binder for a cathode. For example, JP-A-4-95363 discloses the use of vinylidene fluoride-trifluorochloroethylene copolymer (VDF-CTFE) as a binder, whereas JP-A-8-55638 discloses the use of poly(vinylidene fluoride) (PVDF) as a binder. However, the binder disclosed in each of these Japanese documents does not meet the requirement of the present invention that it releases halogen atoms, halogen ions or a reactive halogen-containing substance for reacting with the anode before oxygen is released from the cathode active substance due to a temperature rise reacts with the anode (or in a temperature range of 100~380° C.).

Specifically, JP-A-4-95363 aims to prevent a deterioration of adhesion due to expansion and contraction of the cathode active substance and therefore uses, as the binder of the cathode, a highly elastic material such as vinylidene fluoride-trifluorochloroethylene copolymer. Thus, the proportion of trifluorochloroethylene in the copolymer should be set higher than 15 wt % in order to make the resulting copolymer sufficiently elastic. As a result, a portion of the copolymer dissolves in the electrolytic solution to adversely affect the battery characteristics. Further, the copolymer cannot provide a function of releasing halogen atoms, halogen ions or a reactive halogen-containing substance for reacting with the anode before oxygen released from the cathode active substance due to a temperature rise reacts with the anode.

On the other hand, poly(vinylidene fluoride) used in the lithium secondary battery of JP-A-8-55638 has a high weight-average molecular weight (Mw) of more than $20 \times 10^4$ and a high number-average molecular weight (Mn) of more than $7 \times 10^4$. Thus, this fluorine compound does not thermally decompose easily. As a result, the fluorine compound cannot provide a function of releasing halogen atoms, halogen ions or a reactive halogen-containing substance for reacting with the anode before oxygen released from the cathode active substance due to a temperature rise reacts with the anode.

In this way, not all halogen compounds are applicable to the present invention. Usable for the present invention are only those halogen compounds which are capable of releasing halogen atoms, halogen ions or a reactive halogen-containing substance for reacting with the anode before oxygen released from the cathode active substance due to a temperature rise reacts with the anode (or in a temperature range of 100~380° C.). Particularly, in the case of halogen-containing polymers (including copolymers), the degree of polymerization and the proportion of monomers in the copolymer are closely related to the above-described function. However, since various kinds of halogen compounds including non-polymers are usable in the present invention, it is impossible to set out the general requirements which the halogen compound must satisfy the requirements for fulfilling the above-described function. Giving the specific requirements only for poly(vinylidene fluoride) and vinylidene fluoride-trifluorochloroethylene copolymer, the former should preferably have a number-average molecular weight (Mn) of no more than $5 \times 10^4$, whereas the latter should preferably contain no more than 15 wt % of trifluorochloroethylene in the copolymer.

The present invention will be apparent from the detailed description of the preferred embodiments given below with reference to the accompanying drawings.

DETAILED DESCRIPTION OF THE PREFERRED EMBODIMENTS

The preferred embodiments of the present invention will be described below with reference to the accompanying drawings.

Figure 1:
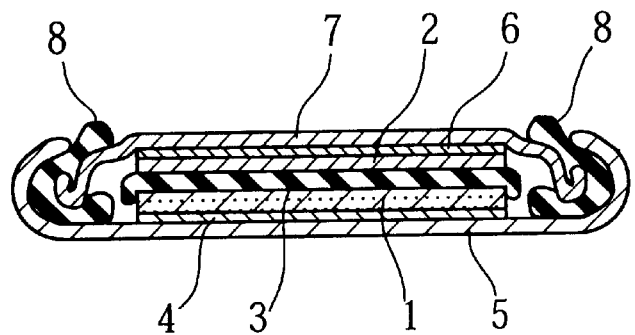
FIG. 1 is a sectional view showing a typical example of coin-type lithium secondary battery to which the present invention may be applied.
Figure 2:
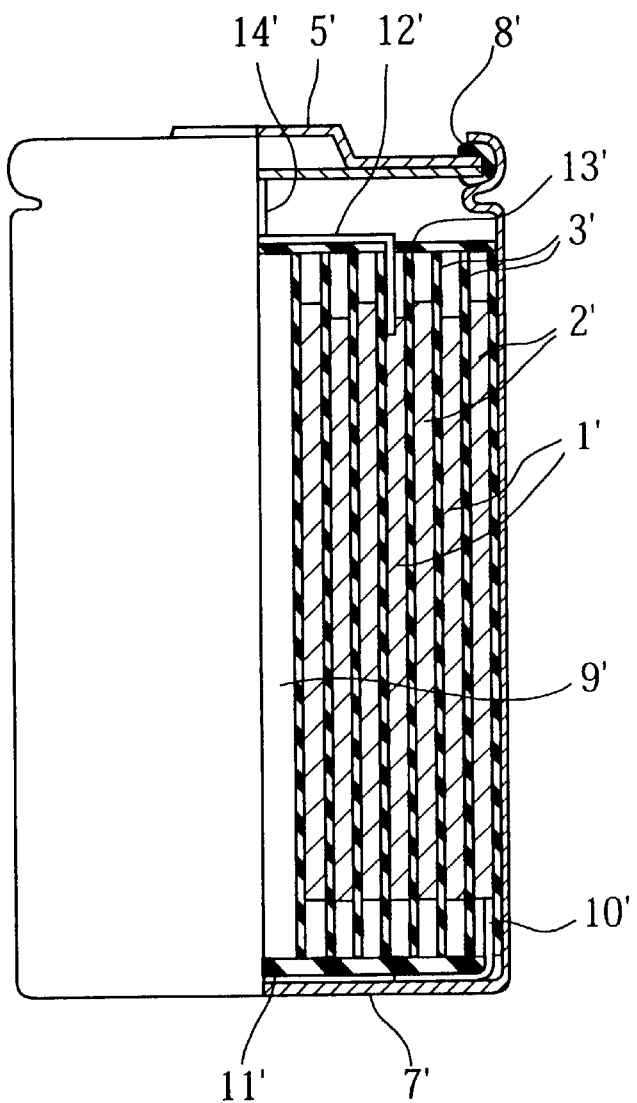
FIG. 2 is a sectional view showing a typical example of cylindrical lithium secondary battery to which the present invention may be applied.

FIGS. 1 and 2 of the accompanying drawings illustrate two typical examples of lithium secondary battery to which the present invention may be advantageously applied. Of these figures, FIG. 1 shows a coin-type battery, whereas FIG. 2 represents a cylindrical battery.

Referring first to FIG. 1, the coin-type lithium secondary battery includes a cathode 1 which contains $LiCoO_2$ as an active substance for example, an anode 2 made of e.g. a lithium foil, and a separator 3 made of e.g. a porous polypropylene or polyethylene film and interposed between the cathode 1 and the anode 2. The cathode 1 is formed on a cathode current collector 4 which is made of e.g. aluminum, and the cathode current collector 4 is attached on an inner surface of a cathode terminal 5 made of e.g. stainless steel. Similarly, the anode is formed on an anode current collector 6 which is made of e.g. aluminum, and the anode current collector 6 is attached on an inner surface of an anode terminal 7 made of e.g. stainless steel. The cathode terminal 5 and the anode terminal 7 form a container which is packed with a nonaqueous electrolytic solution prepared for example by dissolving $LiPF_6$ in an organic solvent mixture of ethylene carbonate (EC) and dimethyl carbonate (DMC) or an organic mixture solution of propylene carbonate (PC) and 1,2-dimethoxyethane (DME). An annular packing 8 made of e.g. polypropylene is interposed between the cathode terminal 5 and the anode terminal 7 at the peripheral portions thereof to seal the container. In accordance with the present invention, the cathode 1 contains a halogen compound (e.g. hexabromobenzene, tetrabromobisphenol S, 4,4'-diiodobiphenyl, poly(vinylidene fluoride) and vinylidene fluoride-trifluorochloroethylene copolymer).

Figure 3:
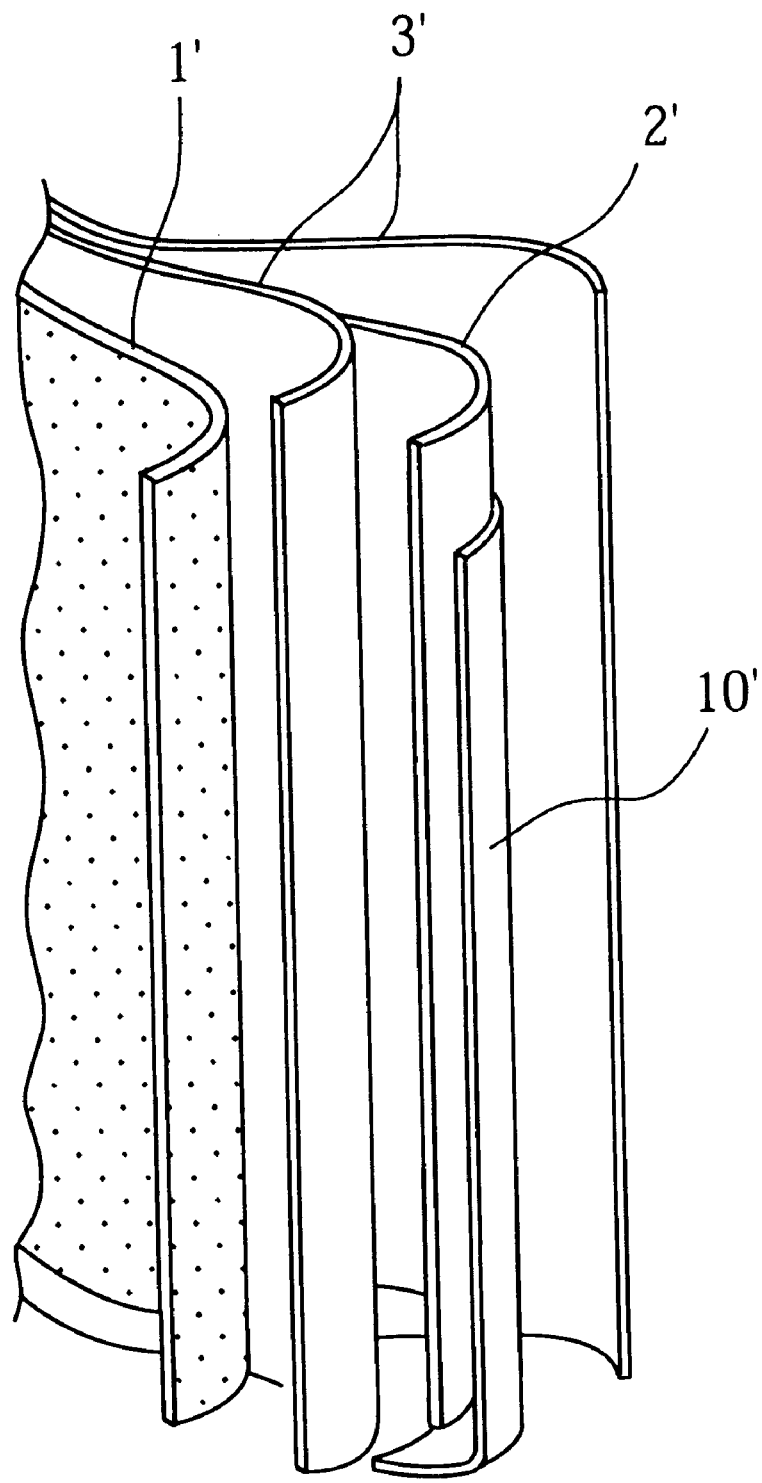
FIG. 3 is a fragmentary perspective view showing a laminate of cathode-anode-separator, partially exploded, which is incorporated in the cylindrical lithium secondary battery shown in FIG. 3.

Similarly, the cylindrical lithium secondary battery illustrated in FIG. 2 also includes a cathode 1' which contains $LiCoO_2$ or $LiNi_{0.8}Co_{0.2}O_2$ as an active substance for example, an anode 2' made of e.g. a lithium foil, and a separator 3' made of e.g. a porous polypropylene or polyethylene film and interposed between the cathode 1' and the anode 2'. The laminate of the cathode 1', the anode 2' and the separator 3', which is originally a long strip of such a laminate (see FIG. 3), is helically wound around a center pin 9' and accommodated in a cylindrical anode terminal container 7' which may be made of e.g. stainless steel. Though not clear from FIGS. 2 and 3, the cathode 1' is prepared by applying a cathode composition on both surfaces of e.g. an aluminum foil as a cathode collector and rolling the cathode composition, whereas the anode 2' includes lithium foils (as an anode active substance) attached on both surfaces of e.g. a copper foil as an anode collector. In accordance with the present invention, the cathode 1' contains (e.g. hexabromobenzene, tetrabromobisphenol S, 4,4'-diiodobiphenyl, poly(vinylidene fluoride) and vinylidene fluoride-trifluorochloroethylene copolymer).

The anode 2' is provided with an anode lead tab 10' which extends beyond a lower insulating plate 11' into contact with an inner bottom surface of the anode terminal container 7'. The cathode 1' is held in conduction with a cathode lead tab 12' which extends through an upper insulating plate 13' into electrical conduction with a cathode terminal lid 5' via a cathode lead pin 14'. The space formed by the combination of the cathode terminal lid 5' and the anode terminal container 7' is packed with a nonaqueous electrolytic solution prepared for example by dissolving $LiPF_6$ in an organic solvent mixture of ethylene carbonate (EC) and dimethyl carbonate (DMC) or an organic mixture solution of propylene carbonate (PC) and 1,2-dimethoxyethane (DME). An annular packing 8' made of, e.g., polypropylene is interposed between the cathode terminal lid 5' and the anode terminal container 7' for sealing purposes.

Next, examples of the present invention together with comparative examples will be specifically described. It should be pointed out beforehand that the halogen compound is contained in the cathode separately from the binder in Examples 1~3, whereas the halogen compound is contained in the cathode as the binder in Examples 4 and 5.

EXAMPLE 1

In Example 1, a plurality of cylindrical lithium secondary batteries each having the structure shown in FIG. 2 were manufactured by incorporating a cathode, an anode, a separator and a nonaqueous electrolytic solution, as specified below. Each of the batteries, which had a diameter of 14 mm and a length of 50 mm, was subjected to either one of a crushing test, a nail-piercing test and a heating test.

Cathode

For making a cathode composition, a uniform mixture was prepared which contained 82 wt % of $LiCoO_2$ as a cathode active substance, 5 wt % of acetylene black plus 5 wt % of graphite as electrically conductive agents, 5 wt % of poly(vinylidene fluoride) (hereafter referred to as "PVDF-2") having a weight-average molecular weight (Mw) of $20.7\times10^4$ and a number-average molecular weight (Mn) of $7.6\times10^4$ as a binder, and 3 wt % of hexabromobenzene as a halogen compound, the mixture being kneaded with the addition of N-methylpyrrolidone to provide a slurry. The resulting slurry thus obtained was applied to both surfaces of an aluminum foil (thickness: 20 μm) as a cathode collector and rolled after drying, thereby providing a cathode 1' (thickness: 250 μm).

Anode

For providing an anode 2', a copper foil as an anode collector was sandwiched between lithium foils (thickness: 100 μm) as an anode active substance.

Separator

A porous polyethylene film was used as a separator 3' (thickness: 25 μm).

Electrolytic Solution $LiPF_6$ (lithium hexafluorophosphate) was dissolved in a 1:1 solvent mixture of propylene carbonate (PC) and 1,2-dimethoxyethane (DME) for preparing an electrolytic solution having a concentration of 1 mol/dm$^3$. 2.4 g of this electrolytic solution was injected in the battery.

Crushing Test

One (1) sample of the lithium secondary batteries incorporating the above elements was subjected to a crushing test. In the crushing test, a presser rod (substantially square in cross section) was pressed diametrically against a lengthwise center portion of the battery which had been charged up to a voltage of 4.2V (first charged to a voltage of 4.2 V at a speed of 1.0 mA/cm$^2$, then discharged to a voltage of 3 V, and again charged to a voltage of 4.2 V) for crushing the battery (center portion) to half of the original battery diameter. The results of the crushing test are shown in Table 1.

TABLE 1

Results of Tests

| Battery ID | Capacity (mAh) | Crushing Ignited? | Piercing Ignited? | Heating Ignited? + Broken? |
|---|---|---|---|---|
| Example 1 | 900 | No | No | No + No |
| Example 2 | 1250 | No | No | No + No |
| Example 3 | 900 | No | No | No + No |
| Comparison 1 | 900 | Yes (Severe) | Yes (Severe) | Yes + Yes (Severe) |

Nail-Piercing Test

Another sample of the batteries was subjected to a nail-piercing test. In the nail-piercing test, a central portion of the battery charged up to a voltage of 4.2V (as previously defined) was completely pierced with a nail having a diameter of 2.5 mm. The results of the nail-piercing test are also shown in Table 1 above.

Heating Test

A further sample of the batteries was subjected to a heating test. In the heating test, the battery charged up to a voltage of 4.2V (as previously defined) was heated in an electric oven at a speed of 5° C./min up to a temperature of 160° C. and held at this temperature for 10 minutes. The results of the heating test are also shown in Table 1 above.

EXAMPLE 2

In Example 2, a plurality of cylindrical lithium secondary batteries identical to those of Example 1 were manufactured except for the use of a cathode composition which contained 82 wt % of $LiNi_{0.8}Co_{0.2}O_2$ as a cathode active substance, 5 wt % of acetylene black plus 5 wt % of graphite as electrically conductive agents, 5 wt % of PVDF-2 as a binder, and 3 wt % of tetrabromobisphenol S as a halogen compound. One sample of the batteries was subjected to the crushing test, whereas another sample was subjected to the nail-piercing test, a further sample being subjected to the heating test. The results of the respective tests are also shown in Table 1 above.

EXAMPLE 3

In Example 3, a plurality of cylindrical lithium secondary batteries identical to those of Example 1 were manufactured except for the use of a cathode composition which contained 82 wt % of $LiCoO_2$ as a cathode active substance, 5 wt % of acetylene black plus 5 wt % of graphite as electrically conductive agents, 5 wt % of PVDF-2 as a binder, and 3 wt % of 4,4'-diiodebiphenyl as a halogen compound. One sample of the batteries was subjected to the crushing test, whereas another sample was subjected to the nail-piercing test, a further sample being subjected to the heating test. The results of the respective tests are also shown in Table 1 above.

Comparison 1

For comparison, a plurality of cylindrical lithium secondary batteries identical to those of Example 1 were manufactured except for the use of a cathode composition which contained 85 wt % of $LiCoO_2$ as a cathode active substance, 5 wt % of acetylene black plus 5 wt % of graphite as electrically conductive agents, and 5 wt % of PVDF-2 as a binder. One sample of the batteries was subjected to the crushing test, whereas another sample was subjected to the nail-piercing test, a further sample being subjected to the heating test. The results of the respective tests are also shown in Table 1 above.

EXAMPLE 4

In Example 4, a plurality of cylindrical lithium secondary batteries identical to those of Example 1 were manufactured except for the use of a different cathode composition and a different electrolytic solution. Specifically, the cathode composition used in this example contained 90 wt % of $LiCoO_2$ as a cathode active substance, 2.5 wt % of acetylene black plus 2.5 wt % of graphite as electrically conductive agents, and 5 wt % of poly(vinylidene fluoride) (hereafter referred to as "PVDF-1") having a weight-average molecular weight (Mw) of $10.8 \times 10^4$ and a number-average molecular weight (Mn) of $4.2 \times 10^4$ as a binder. The electrolytic solution was prepared by dissolving $LiPF_6$ (lithium hexafluorophosphate) in a 1:2 solvent mixture of ethylene carbonate (EC) and dimethylcarbonate (DMC) at a concentration of 1 mol/dm$^3$.

Seven samples of the manufactured batteries were subjected to the crushing test as in Example 1. The results of the crushing test are shown in Table 2 where the notation "NGs" represents the number of samples which ignited due to excessive heat generation.

TABLE 2

Results of Crushing Test

| Identification of Batteries | NGs/Samples (Percentage) |
|---|---|
| Example 4 | 0/7 (0%) |
| Example 5 | 0/6 (0%) |
| Comparison 2 | 10/10 (100%) |

Separately from the crushing test, PVDF-1 used in this example was subjected to the thermogravimetric-mass spectrometric analysis (TG-MS analysis) for checking whether this halogen compound provides the thermal decomposition characteristics required for the present invention, as described below.

TG-MS Analysis

The TG-MS analysis utilizes a combination of a thermogravimetric analyzer and a mass spectrometric analyzer. In the analysis, the specimen is heated at a constant speed in the thermogravimetric analyzer for thermal decomposition, and the gas components generated as a result of such thermal decomposition are introduced in the mass spectrometric analyzer for analysis through ionization.

In the present example, Thermo Plus TG8120 (Product Name) available from Rigaku International Corporation was used as the thermogravimetric analyzer, whereas a combined system of GC-17A (Product Name) and QP-5000 (Product Name) both available from Shimazu Corporation was used as the mass spectrometric analyzer. PVDF-1 as the specimen was heated, in the thermogravimetric analyzer, up to a temperature of 575° C. at a speed of 10° C./min for thermal decomposition, and the gas components generated in the course of the heating were introduced into the mass spectrometric analyzer for analysis through ionization.

Figure 4:
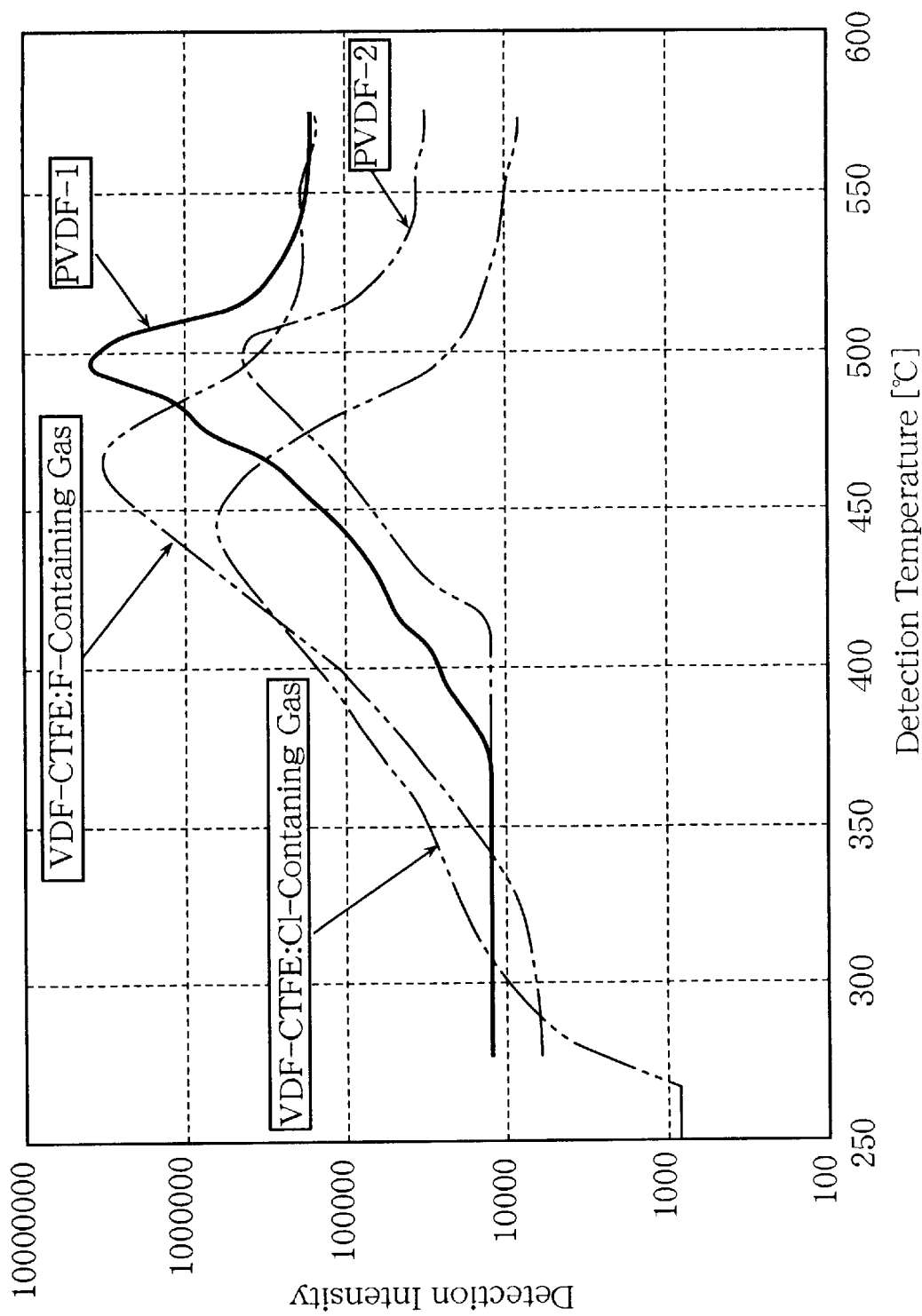
FIG. 4 is a graph showing the thermal decomposition characteristics of various fluororesins.

The results of the TG-MS analysis are shown in the graph of FIG. 4 where the abscissa represents the detection temperature while the ordinate represents the count (intensity) of the detected ions which is proportional to the amount of the gas components generated by the thermal decomposition. It should be noted that the scale of the ordinate is logarithmic.

EXAMPLE 5

In Example 5, six (6) samples of cylindrical lithium secondary batteries identical to those of Example 4 except for the use of a cathode composition which contained 90 wt % of $LiCoO_2$ as a cathode active substance, 2.5 wt % of acetylene black plus 2.5 wt % of graphite as electrically conductive agents, and 5 wt % of vinylidene fluoride-trifluorochloroethylene copolymer (hereafter referred to as "VDF-CTFE"), the trifluorochloroethylene content of which is 15 wt %, as a binder.

Each of the six samples was subjected to the crushing test as in Example 1.

Further, the VDF-CTFE was analyzed by the TG-MS analysis as in Example 4 for determining its thermal decomposition characteristics.

The results of the crushing test and the TG-MS analysis are shown in Table 2 and in FIG. 4, respectively.

Comparison 2

For comparison, ten (10) samples of cylindrical lithium secondary batteries identical to those of Example 1 except for the use of a cathode composition which contained 90 wt % of $LiCoO_2$ as a cathode active substance, 2.5 wt % of acetylene black plus 2.5 wt % of graphite as electrically conductive agents, and 5 wt % of PVDF-2 as a binder.

Each of the ten samples was subjected to the crushing test as in Example 1.

Further, the PVDF-2 was analyzed by the TG-MS analysis as in Example 4 for determining its thermal decomposition characteristics.

The results of the crushing test and the TG-MS analysis are shown in Table 2 and in FIG. 4, respectively.

Evaluation

As noted from Table 1, all of the battery samples made in Examples 1~3 did not experience excessive heat generation nor ignition in the crushing test, the nail-piercing test or the heating test. This fact clearly indicates that the halogen compound contained in the cathode in addition to the cathode active substance, the electrically conductive agent and the binder underwent thermal decomposition before release of oxygen for preventing oxidation of lithium. By contrast, the battery samples of Comparison 1 containing no halogen compound other than the PVDF-2 as the binder equally suffered ignition in the respective test, which indicates that an excessive heat generation cannot be prevented in the absence of an additional halogen compound which is capable of releasing a halogen-family gas before release of oxygen.

Further, as understood from Table 2, all of the battery samples made in Examples 4 and 5 did not experience ignition in the crushing test, which clearly indicates that the halogen compound, even if contained in the cathode as a binder, can prevent excessive heat generation as long as it provides the function of releasing a reactive halogen-family gas before oxygen released from the cathode reacts with the anode. Further, it is also appreciated from Example 4 and Comparison 2 that PVDF-1 is capable of preventing excessive heat generation while PVDF-2 is incapable of providing such a function, which indicates that the thermal decomposition characteristics of halogen compounds, even if similar in structure, are affected by different conditions such as the degree of polymerization. In this regard, it is understood from FIG. 4 that PVDF-1 and VDF-CTEF start decomposing to release halogen-family gases at a temperature below 380° C. (at which oxygen release may start), whereas PVDF-2 starts thermal decomposition only at 420° C.

Therefore, it is concluded that the lithium secondary battery according to the present invention is advantageous for its high safety even under severe conditions such as battery crushing, nail piercing, internal shorting, high-temperature exposure and/or external shorting.

The present invention being thus described, it is obvious that the same may be varied in many ways. Such variations should not be regarded as a departure from the spirit and scope of the present invention, and all such modifications as would be obvious to those skilled in the art are intended to be included within the scope of the following claims.

What is claimed is:

1. A lithium secondary battery comprising:

a cathode which can be dischargeably charged with lithium ions;

an anode selected from the group consisting of lithium metal and a lithium alloy; and an electrolyte which allows migration of lithium ions between both electrodes;

wherein the cathode contains a halogen compound in addition to a cathode active substance, an electrically conductive agent and a binder, the halogen compound releasing halogen atoms, halogen ions or a reactive halogen containing substance for reacting with the anode and for thereby deactivating the anode to prevent excessive heat generation before oxygen released from the cathode due to a temperature rises reacts with the anode; and wherein the halogen compound is selected from the group consisting of tetrabromobisphenol S and 4,4'-diiodobiphenyl.

2. The lithium secondary battery according to claim 1, wherein the halogen compound thermally decomposes at a temperature of 100~380° C. to release said halogen atoms, halogen ions or reactive halogen-containing substance.

3. The lithium secondary battery according to claim 1, wherein the content of the halogen compound in the cathode is 0.5~20 wt %.

4. A cathode composition for a lithium secondary battery, the cathode composition containing:

a cathode active substance which can be dischargeably charged with lithium ions;

an electrically conductive agent;

a binder, and a halogen compound which releases halogen atoms, halogen ions or a reactive halogen-containing substance at a temperature of 100~380° C. by thermal decomposition;

wherein the halogen compound is different from the cathode active substance and the binder; and wherein the halogen compound is selected from the group consisting of tetrabromobisphenol S and 4,4'-diiodobiphenyl.

* * * * *